US009858263B2

(12) United States Patent
Xiao et al.

(10) Patent No.: US 9,858,263 B2
(45) Date of Patent: Jan. 2, 2018

(54) SEMANTIC PARSING USING DEEP NEURAL NETWORKS FOR PREDICTING CANONICAL FORMS

(71) Applicant: Conduent Business Services, LLC, Dallas, TX (US)

(72) Inventors: Chunyang Xiao, Grenoble (FR); Marc Dymetman, Grenoble (FR); Claire Gardent, Paris (FR)

(73) Assignees: Conduent Business Services, LLC, Dallas, TX (US); Centre National De La Recherche Scientifique, Paris (FR)

( * ) Notice: Subject to any disclaimer, the term of this patent is extended or adjusted under 35 U.S.C. 154(b) by 14 days.

(21) Appl. No.: 15/147,222

(22) Filed: May 5, 2016

(65) Prior Publication Data
US 2017/0323636 A1 Nov. 9, 2017

(51) Int. Cl.
| | |
|---|---|
| G06F 17/27 | (2006.01) |
| G10L 15/16 | (2006.01) |
| G10L 19/00 | (2013.01) |
| G10L 15/197 | (2013.01) |
| G06F 17/30 | (2006.01) |
| G06N 3/08 | (2006.01) |

(52) U.S. Cl.
CPC ...... *G06F 17/2785* (2013.01); *G06F 17/2705* (2013.01); *G06F 17/276* (2013.01); *G06F 17/2775* (2013.01); *G06F 17/30637* (2013.01); *G06N 3/08* (2013.01); *G10L 15/16* (2013.01); *G10L 15/197* (2013.01); *G10L 19/0018* (2013.01)

(58) Field of Classification Search
CPC ........ G06F 17/2785; G06N 3/02; G06N 3/08
USPC .......................................................... 704/9
See application file for complete search history.

(56) References Cited

U.S. PATENT DOCUMENTS

| | | | | |
|---|---|---|---|---|
| 6,189,002 | B1 * | 2/2001 | Roitblat | G06F 17/3061 |
| 8,793,261 | B2 * | 7/2014 | Jiang | G06F 17/30616 |
| | | | | 704/9 |
| 2005/0267871 | A1 * | 12/2005 | Marchisio | G06F 17/30672 |
| 2011/0301942 | A1 * | 12/2011 | Collobert | G06F 17/2775 |
| | | | | 704/9 |
| 2015/0356075 | A1 * | 12/2015 | Rao | G06N 3/0445 |
| | | | | 705/2 |

(Continued)

OTHER PUBLICATIONS

Graves, Alex. "Generating sequences with recurrent neural networks." arXiv preprint arXiv:1308.0850 (2013).*

(Continued)

*Primary Examiner* — Shaun Roberts
(74) *Attorney, Agent, or Firm* — Fay Sharpe LLP

(57) ABSTRACT

A method for predicting a canonical form for an input text sequence includes predicting the canonical form with a neural network model. The model includes an encoder, which generates a first representation of the input text sequence based on a representation of n-grams in the text sequence and a second representation of the input text sequence generated by a first neural network. The model also includes a decoder which sequentially predicts terms of the canonical form based on the first and second representations and a predicted prefix of the canonical form. The canonical form can be used, for example, to query a knowledge base or to generate a next utterance in a discourse.

19 Claims, 5 Drawing Sheets

(56) References Cited

U.S. PATENT DOCUMENTS

2016/0180215 A1* 6/2016 Vinyals ............... G06F 17/2705
706/20
2016/0189027 A1* 6/2016 Graves .................. G06N 3/063
706/17

OTHER PUBLICATIONS

U.S. Appl. No. 14/811,005, filed Jul. 28, 2015, Marc Dymetman, et al.
U.S. Appl. No. 14/810,817, filed Jul. 28, 2015, Sriram Venkatapathy, et al.
Artzi, et al., "Weakly supervised learning of semantic parsers for mapping instructions to actions," Trans. ACL, vol. 1(1):49-62 (2013).
Bahdanau, et al., "Neural machine translation by jointly learning to align and translate," ICLR 2015, available as CoRR, abs/1409.0473, pp. 1-15 (2014).
Bastien, et al., "Theano: new features and speed improvements," pp. 1-10, available at arXiv preprint arXiv:1211.5590 (2012).
Berant, et al., Semantic parsing via paraphrasing, Association for Computational Linguistics (ACL) (1), pp. 1415-1425 (2014).
Berant, et al., "Semantic parsing on freebase from question-answer pairs," Empirical Methods in Natural Language Processing (EMNLP). vol. 2, No. 5, p. 1415-1425 (2013).
Bergstra, et al., "Theano: a CPU and GPU math expression compiler," Proc. Python for Scientific Computing Conf. (SciPy), vol. 4, p. 1-7 (2010).
Bordes, et al., "Question answering with subgraph embeddings," Proc. 2014 Conf. on Empirical Methods in Natural Language Processing, EMNLP 2014, pp. 615-620 (2014).
Bordes, et al., "Open question answering with weakly supervised embedding models," Machine Learning and Knowledge Discovery in Databases, vol. 8724 of the series Lecture Notes in Computer Science, pp. 165-180 (2014), available at CoRR, abs/1404A326.
Cho, et al., "Learning phrase representations using RNN encoder-decoder for statistical machine translation," Proc. 2014 Conf. on Empirical Methods in Natural Language Processing (EMNLP), pp. 1724-1734 (2014).
Devlin, "Fast and robust neural network joint models for statistical machine translation," Proc. 52nd Annual Meeting of the ACL (ACL 2014), (1): Long Papers, pp. 1370-1380 (2014).
Fader, et al., "Paraphrase-driven learning for open question answering," Proc. 51st Annual Meeting of the Association for Computational Linguistics (vol. 1: Long Papers), pp. 1608-1618 (2013).
Hill, et al., "Goldilocks principle: Reading children's books with explicit memory representations," pp. 1-13 (2015) available at arXiv:1511.02301.
Hinton, et al., "Neural Networks for Machine Learning," Lecture Slides, Toronto EDU, pp. 1-31 downloaded on May 5, 2016 from http://www.cs.toronto.edu/~tijmen/csc321/slides/lecture_slides_lec6.pdf.
Hochreiter, et al., "Long short-term memory," Neural Computation, 9(8):1735-1780 (1997).
Karpathy, et al., "Deep visual semantic alignments for generating image descriptions," IIEEE Conf. on Computer Vision and Pattern Recognition (CVPR 2015), pp. 3128-3137 (2015).
Kwiatkowski, et al., "Scaling semantic parsers with on-the-fly ontology matching.," Proc. 2013 Conf. on Empirical Methods in Natural Language Processing, EMNLP 2013, pp. 1545-1556 (2013).
Lecun, et al., "Deep learning tutorial." *Tutorials in International Conference on Machine Learning (ICML13), Citeseer.*, pp. i-167 (2013).
Mikolov, et al., "Context dependent recurrent neural network language model," 2012 IEEE Spoken Language Technology Workshop (SLT), pp. 234-239 (2012).
"Multilayer Perception," DeepLearning 0.1 documentation, pp. 1-12, downloaded on Mar. 2, 2016 from http://deeplearning.net/tutorial/mlp.html.
Pascanu, et al., "How to construct deep recurrent neural networks," CoRR, abs/1312.6026, pp. 1-13 (2013).
Pereira, et al., "Definite clause grammars for language analysis: a survey of the formalism and a comparison with augmented transition networks," Artificial Intelligence, 13(3), pp. 231-278 (1980).
Sathyanarayana, "A Gentle Introduction to Backpropagation," pp. 1-15 (2014).
Sutskever, et al., "Sequence to sequence learning with neural networks," Advances in Neural Information Processing Systems 27 (NIPS 2014), pp. 1-9 (2014).
Tieleman, et al., "rmsprop," rmsprop-climin 0.1 documentation, pp. 1-2, downloaded on Mar. 2, 2016 from http://climin.readthedocs.org/en/latest/rmsprop.hrml#id1 (2012).
Vinyals, et al., "Grammar as a foreign language," Advances in Neural Information Processing Systems 28 (NIPS 2015), pp. 1-9 (2014).
Wang, et al., "Building a semantic parser overnight," Proc. 53rd Annual Meeting of the Association for Computational Linguistics and the 7th International Joint Conf. on Natural Language Processing of the Asian Federation of Natural Language Processing (ACL 2015), vol. 1: Long Papers, pp. 1332-1342 (2015).
Wen, et al., "Semantically conditioned LSTM-based natural language generation for spoken dialogue systems," EMNLP 2015, pp. 1711-1721 (2015).
Xu, et al., "Show, attend and tell: Neural image caption generation with visual attention," Proc. 32nd International Conf. on Machine Learning (JMLR: W&CP), vol. 37, pp. 1-10 (2015).
Yih, et al., "Semantic parsing for single-relation question answering," Proc. 52nd Annual Meeting of the Association for Computational Linguistics (ACL 2014), vol. 2: Short Papers, pp. 643-648 (2014).
Zettlemoyer, et al., "Learning to map sentences to logical form: Structured classification with probabilistic categorial grammars," Proc. 21st Conf. in Uncertainty in Artificial Intelligence (UAI '05), pp. 658-666 (2005).

* cited by examiner

SEMANTIC PARSING USING DEEP NEURAL NETWORKS FOR PREDICTING CANONICAL FORMS

BACKGROUND

The exemplary embodiment relates to natural language understanding and finds particular application in connection with a system and method for predicting canonical forms for natural language text.

Semantic Parsing, as used herein, refers to techniques for learning how to map natural language utterances into logical representations that can be operationally interpreted. Mapping natural language utterances to logical forms is useful in various applications involving natural language understanding, such as in the automation of call-centers and in question-answering systems. See, for example, Zettlemoyer, et al., "Learning to map sentences to logical form: Structured classification with probabilistic categorial grammars," Proc. 21st Conf. in Uncertainty in Artificial Intelligence (UAI '05), pp. 658-666, 2005; Berant, et al., "Semantic parsing via paraphrasing," ACL (1), pp. 1415-1425, 2014; Kwiatkowski, et al., "Scaling semantic parsers with on-the-fly ontology matching," Proc. 2013 Conf. on Empirical Methods in Natural Language Processing (EMNLP 2013), pp. 1545-1556, 2013; Artzi, et al., "Weakly supervised learning of semantic parsers for mapping instructions to actions," Trans. ACL, 1(1):49-62, 2013. In question answering, for example, the goal is to be able to process a complex question formulated in natural language, map it into a logical representation, and then retrieve an answer to that question from a Knowledge Base.

Several approaches use paraphrases to build a semantic parser. See, for example, Fader, et al., "Paraphrase-driven learning for open question answering," Proc. 51st Annual Meeting of the ACL (Vol. 1: Long Papers), pp. 1608-1618, 2013; Berant, et al., "Semantic parsing on freebase from question-answer pairs," Empirical Methods in Natural Language Processing (EMNLP). vol. 2, no. 5, p. 6, 2013; Bordes, et al., "Open question answering with weakly supervised embedding models," Machine Learning and Knowledge Discovery in Databases, Vol. 8724 of the series Lecture Notes in Computer Science, pp. 165-180, 2014. These methods typically use paraphrases to learn useful lexical features or to improve sentence embeddings.

Recently an approach for quickly developing semantic parsers for new knowledge bases and domains when no training data initially exists was proposed (Wang, et al., "Building a semantic parser overnight," Proc. 53rd Annual Meeting of the ACL and 7th Intl Joint Conf. on Natural Language Processing of the Asian Federation of Natural Language Processing (ACL 2015), Vol. 1: Long Papers, pp. 1332-1342, 2015, hereinafter, Wang 2015). In this approach, referred to herein as SPO, a small generic grammar is used to generate so-called canonical (textual) forms and pair them with logical forms. Crowdsourcing is then used to paraphrase these canonical forms into natural utterances. The crowdsourcing thus creates a dataset consisting of (u,c,lf) tuples where u is a natural language utterance, c is its canonical form and lf is the logical form associated with c by the grammar. Finally, a semantic parser is learnt over this dataset. In the method of Wang 2015, SPO parses a natural utterance by first retrieving a list of possible logical forms and then learning to rank those. The performance for the SPO method, however, has not been good overall, with an accuracy of less than 50% reported for several domains. In this context, oracle accuracy is the accuracy that the retrieved list effectively contains one correct logical form and ranking accuracy is the accuracy of ranking the correct logical form in first position. In practice, this performance may be due to low oracle accuracy as the retrieved list of logical forms often does not contain the correct one.

INCORPORATION BY REFERENCE

The following references, the disclosures of which are incorporated herein by reference in their entireties, are mentioned:

U.S. application Ser. No. 14/811,005, filed Jul. 28, 2015, entitled A ROBUST REVERSIBLE FINITE-STATE APPROACH TO CONTEXTUAL GENERATION AND SEMANTIC PARSING, by Marc Dymetman, et al.

U.S. application Ser. No. 14/810,817 filed Jul. 28, 2015, entitled LEARNING GENERATION TEMPLATES FROM DIALOG TRANSCRIPTS, by Sriram Venkatapathy, et al.

BRIEF DESCRIPTION

In accordance with one aspect of the exemplary embodiment, a method includes providing a neural network model which has been trained to predict a canonical form for an input text sequence. The neural network model includes an encoder which generates a first representation of the input text sequence based on a representation of n-grams in the text sequence and a second representation of the input text sequence generated by a first neural network, and a decoder which sequentially predicts words of the canonical form based on the first and second representations and a predicted prefix of the canonical form. An input text sequence is received. With the trained neural network model, a canonical form for the input text sequence is predicted and information is output, based on the predicted canonical form.

At least one of the steps of the method may be performed with a processor.

In accordance with another aspect of the exemplary embodiment, a prediction system includes memory which stores a neural network model which has been trained to predict a canonical form for an input text sequence. The neural network model includes an encoder which generates a first representation of the input text sequence based on a representation of n-grams in the text sequence and a second representation of the input text sequence generated by a first neural network, and a decoder which sequentially predicts words of the canonical form based on the first and second representations and a predicted prefix of the canonical form. A prediction component predicts a canonical form for an input text sequence with the trained neural network model. An output component outputs information based on the predicted canonical form. A processor implements the prediction component and the output component.

In accordance with another aspect of the exemplary embodiment, a method for predicting a canonical form includes providing training data, the training data comprising a collection of training pairs, each training pair in the collection including a canonical form and a corresponding text sequence. With the training data, a neural network model is trained to predict a canonical form for an input text sequence. The neural network model includes an encoder and a decoder. The encoder generates a first representation of the input text sequence based on a representation of n-grams in the text sequence and a second representation of the input text sequence generated by a first neural network. The decoder sequentially predicts words of the canonical form based on the first and second representations and a predicted prefix of the canonical form. An input text sequence is retrieved and a canonical form for the input text sequence is predicted with the trained neural network model. Information based on the predicted canonical form is output.

At least one of the steps of the method may be performed with a processor.

DETAILED DESCRIPTION

Figure 1:
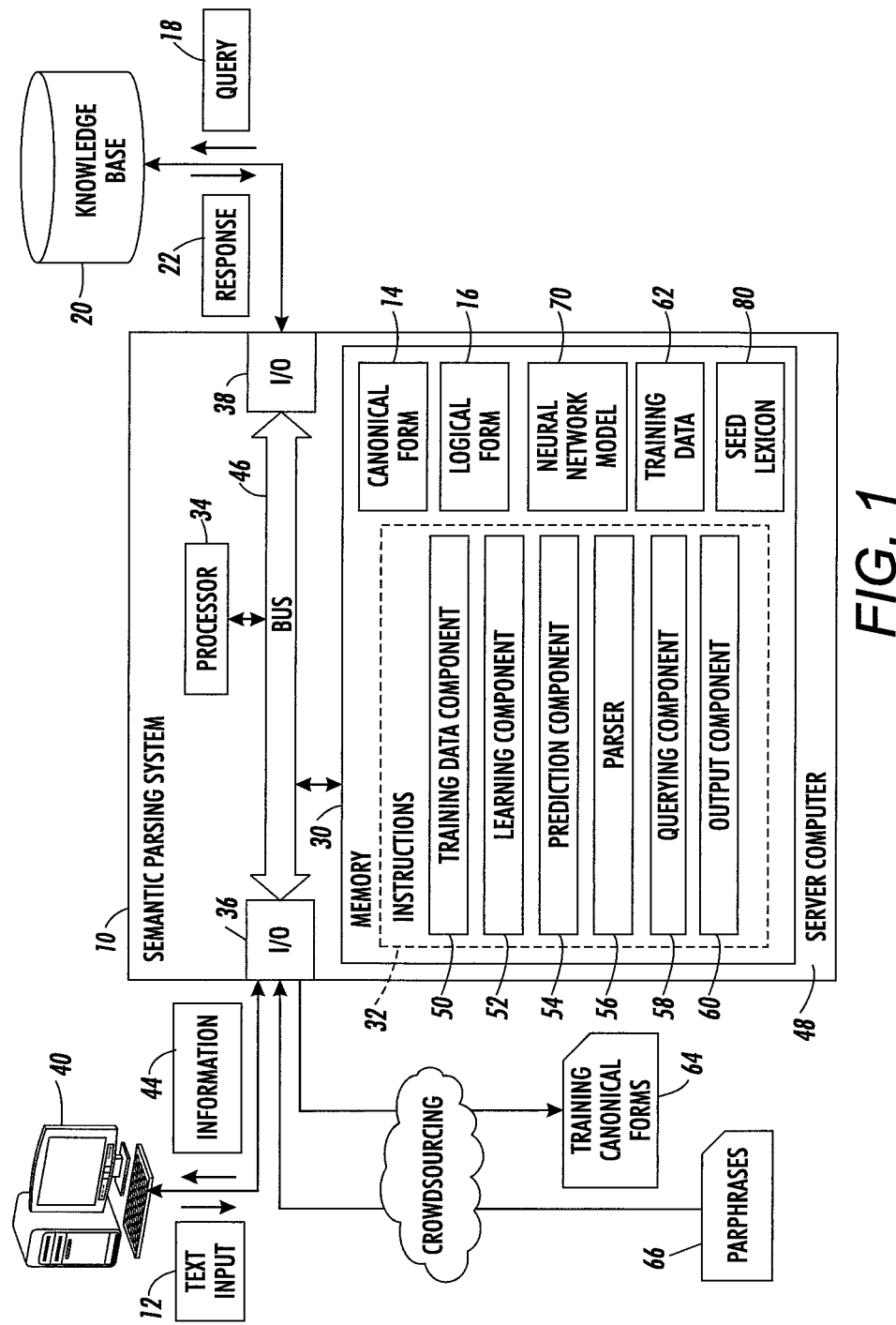
FIG. 1 is a functional block diagram of a semantic parsing system in accordance with one aspect of the exemplary embodiment.

FIG. 1 illustrates a computer-implemented semantic parsing system 10 which receives input natural language text 12, such as a question in a natural language, such as English, and predicts a canonical form 14 for the input text. The canonical form 14 can be parsed to generate a logical form 16, which may be used to generate a query 18 for querying an information source 20, such as a knowledge base and retrieving responsive information 22.

A "canonical form," is a normalized pseudo-natural language that is close to English, which can easily be translated into a logical form exploitable by search tools over knowledge bases.

The system 10 includes memory 30, which stores instructions 32 for performing a method described with reference to FIG. 2, and a processor 34, in communication with the memory, for executing the instructions. The system includes one or more input/output devices 36, 38, for communication with external devices, such as a source 40 of the input text 12, via wired or wireless links 42, such as a local area network or a wide area network, such as the Internet. The system outputs information 44, such as the canonical form 14, logical form 16, query response 20, and/or information based thereon. Hardware components 30, 34, 36, 38 of the system communicate via a data/control bus 46. The system may be hosted by one or more computing devices, such as the illustrated server computer 48.

The illustrated instructions 32 include a training data component 50, a learning component 52, a prediction component 54, a parser 56, a querying component 58, and an output component 60, although it is to be appreciated that one or more of these components may be omitted from the system 10 and/or hosted by different computing systems.

Briefly, the training data component 50 provides the learning component 52 with training data 62. The training data 62 includes a set of training canonical forms 64 and respective paraphrases 66. The training data 62 may have been previously generated and input to the system. In another embodiment, the training data is generated from a seed lexicon 68, using crowdsourcing to generate text sequences that are 66 paraphrases of canonical forms 64 generated from the seed lexicon by the training data component 50.

Figure 3:
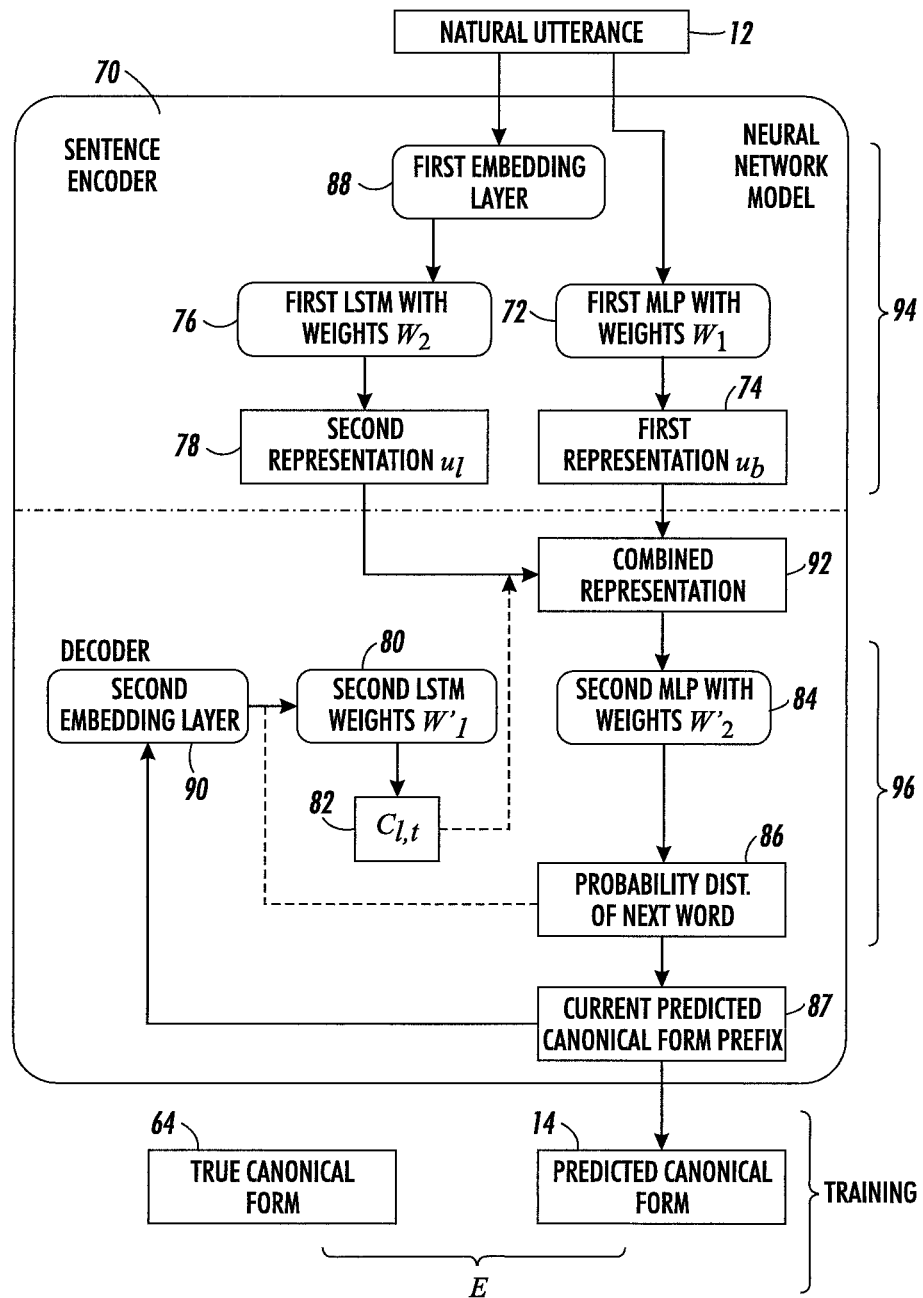
FIG. 3 illustrates a neural network model in the system of FIG. 1.

The learning component 52 learns a neural network model 70 for predicting a canonical form 14, given an input text sequence 12. The neural network is learned using the training data 62 which includes training pairs, each training pair including a natural language text sequence 66 and a corresponding canonical form 64. An example neural network model 70 is illustrated in FIG. 3 and includes an encoder for encoding the natural utterance and a decoder for predicting the canonical form based on the encoding, and is described in further detail below.

The prediction component 54 uses the learned neural network model 70 to predict a canonical form 14 for an input text sequence 12.

The parser 56 generates a logical form 16 from the canonical form 14 using a suitable grammar.

The querying component 58 uses the logical form 16 to generate a query 18 for querying the knowledge base 20. One or more responses 22 retrieved from the knowledge base by the query, or other information 66 based thereon, may be output by the output component 60, e.g., to the source 40 of the query.

As will be appreciated, the canonical form 14 may be used for other purposes, such as generating a next utterance by an agent (virtual or real) in a discourse with a person, such as a customer seeking assistance from a call center.

The computer system 10 may include one or more computing devices 48, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 30 may represent any type of non-transitory computer readable medium such as random access memory (RAM), read only memory (ROM), magnetic disk or tape, optical disk, flash memory, or holographic memory. In one embodiment, the memory 30 comprises a combination of random access memory and read only memory. In some embodiments, the processor 34 and memory 30 may be combined in a single chip. Memory 30 stores the processed data 14, 16 as well as the instructions for performing the exemplary method.

The network interface 36, 38 allows the computer to communicate with other devices via a computer network, such as a local area network (LAN) or wide area network (WAN), or the internet, and may comprise a modulator/demodulator (MODEM) a router, a cable, and/or Ethernet port.

The digital processor device 34 can be variously embodied, such as by a single-core processor, a dual-core processor (or more generally by a multiple-core processor), a digital processor and cooperating math coprocessor, a digital controller, or the like. The digital processor 34, in addition to executing instructions 32 may also control the operation of the computer 48.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 2:
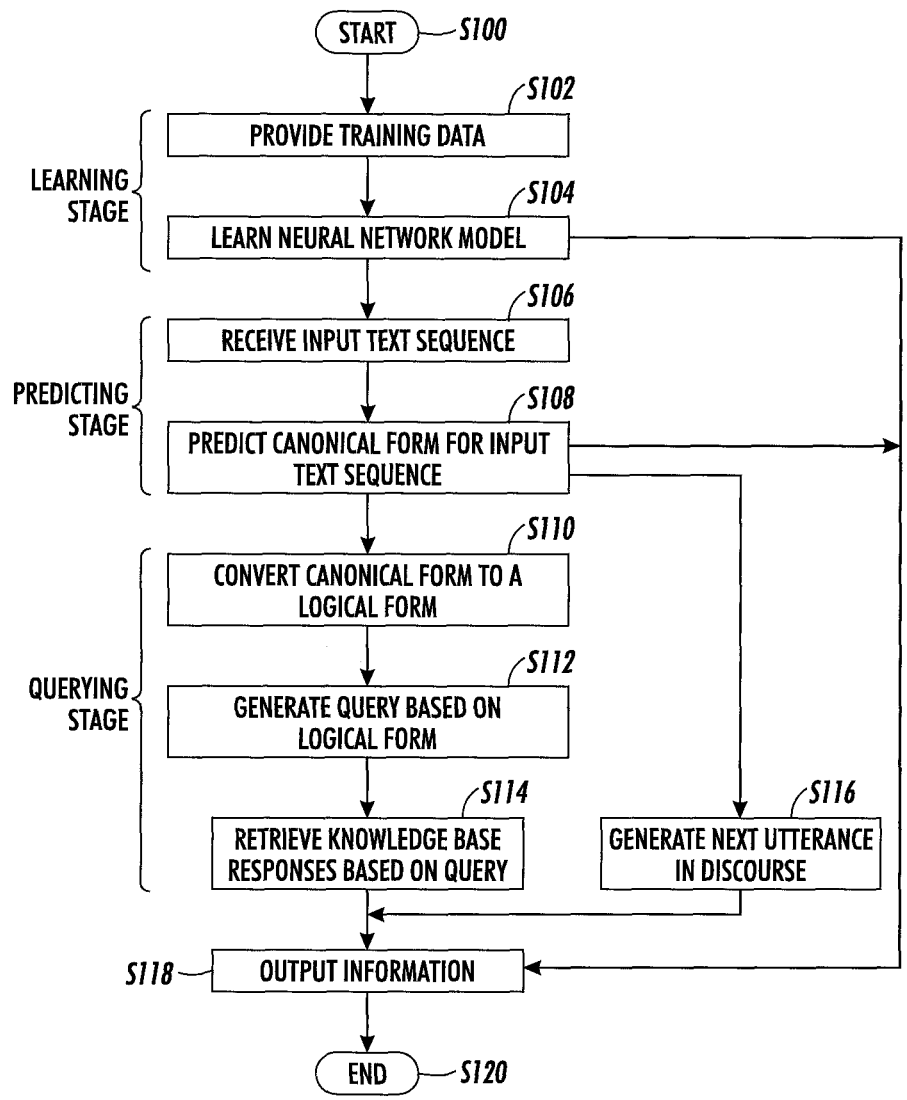
FIG. 2 is a flowchart illustrating a semantic parsing method in accordance with another aspect of the exemplary embodiment.

FIG. 2 illustrates an exemplary method which may be performed with the system of FIG. 1. The illustrated method includes a learning stage, a predicting stage, and a querying stage, although fewer than all of these stages may be performed. The method begins at S100.

At S102, training data 62 for learning the neural network 70 is provided, e.g., input to the system or generated by the training data component 50, as further described with reference to FIG. 3.

At S104, the neural network model 70 is learned by the learning component 52, using the training data 62.

At S106, an input text sequence 12 is received, and may be stored in memory 30 during processing.

At S108, a canonical form 14 corresponding to the input text sequence 12 is predicted with the trained neural network model 70, by the prediction component 54.

At S110, in one embodiment, the canonical form 14 is converted to a logical form 16 by the parser 56.

At S112, the logical form 16 may be used, by the querying component 58, to generate a query 18 for querying the knowledge base 20 and at S114, one or more responses 22 is/are received.

In another embodiment, the canonical form may be used at S116 to identify a next utterance of a discourse, e.g., between an agent and a customer.

At S118, information 44 based on the canonical form, response(s) 22, and or next utterance is output from the system 10, by the output component 60.

The method ends at S120.

In other embodiments, the method may include only the learning stage, in which case, the output of the system may be the trained neural network 70. In other embodiments, the method may be used for one or more of steps S106-S116, i.e., assuming the existence of the already trained neural network 70.

Further details of the system and method will now be described.

The Neural Network Model

The exemplary neural network model 70 is a seq2seq (i.e., sequence to sequence) recurrent neural network model that maps natural utterances to canonical utterances. A "recurrent neural network" (RNN) is a type of neural network in which connections between units form a directed cycle. This creates an internal state of the network which allows it to exhibit dynamic temporal behavior. The RNN 70 progressively builds up the output sequence 14 in a number of cycles.

Inside the seq2seq model, a bag of n-grams representation of the original sentence is used to help the recurrent model prediction. The term n-grams is used herein to refer to both unigram and bigram features (and optionally, longer n-grams, such as trigrams). The bag of n-grams representation is thus an integer-valued vector over the union of possible unigrams and bigrams.

An exemplary neural network model 60 is illustrated in FIG. 3. The model 70 includes a first multilayer perceptron (MLP) 70, which encodes the entire sentence 12 as a set of n-grams and produces a first representation 74 of the natural utterance 12, denoted $u_b$, based on the n-grams. A first recurrent neural network (RNN) 76, such as a long short-term memory (LSTM) RNN, reads the sentence 12 and produces a second representation 78 of the natural utterance 12, denoted $u_l$. A second recurrent neural network (RNN) 80, such as a LSTM, generates a representation 82 of the prefix of the canonical form up to time t, denoted $c_{l,t}$, by considering each word of the canonical form in turn. The representation 82, together with representations $u_b$ and $u_l$, are fed into a second multilayer perceptron (MLP) 84 which predicts the next term (e.g., a word or short sequence of words) 86 of the current predicted canonical form 87. The final words of the output canonical form 14 are computed with Eqn. 1. Both LSTMs 76, 80 can be preceded by a respective embedding layer 88, 90 which are both initialized randomly and learned jointly (during training) with the whole network. The embedding layers map the respective inputs (natural utterance 12) and next word) into a vector of real numbers. The neural network model 70 thus predicts the canonical form word by word, based on the sequence words predicted so far. The components 72 and 76 serve as the sentence encoder 94 for the neural network model 70 while the components 80 and 86 serve as the decoder 96 of the model.

The goal of the neural network model 70 is to estimate the conditional probability of the canonical form 14 given the input sequence 12, denoted $P(y_1, \ldots, y_T | x_1, \ldots, x_T)$, where $(x_1, \ldots, x_T)$ is a natural utterance 12 containing a sequence of words and $(y_1, \ldots, y_T)$ is a canonical form 14, containing a sequence of words, which can be the same number of words as the input sequence or a different number.

In an exemplary embodiment, $u_l$ can be the representation of the natural utterance 12 computed by the last hidden layer of the first LSTM 76. As the LSTM 76, an LSTM as described, for example in Hochreiter, et al., "Long short-term memory," Neural Computation, 9(8):1735-1780, 1997, can be employed. The first MLP 72 is a feedforward type of neural network that maps the n-grams of the input utterance to a representation $u_b$. The first MLP 72 includes multiple layers of nodes in a directed graph, with each layer fully connected to the next one. In the exemplary embodiment, $u_b$ can be a representation 74 of the natural utterance computed by the multilayer perceptron (MLP) 72 over bags of n-grams of the sentence such that $u_b=s(W_2(s(W_1(n)))$, where n is the n-gram representation of the sentence, $W_1$, $W_2$ are parameter matrices, and s is a non-linear activation function that maps the weighted inputs to the output of each neuron. In the exemplary embodiment, s is the hyperbolic tangent activation function tan h, although other functions, such as the logistic sigmoid function, may be used. In the learning stage, described below, the matrices $W_1$, $W_2$ are progressively updated during learning of the model 70.

As noted above, $c_{l,t}$ is the representation of the prefix 87 of the canonical forms generated by the second LSTM 80 up to time t. Like $u_l$, $c_{l,t}$ can be calculated as the last hidden layer of the LSTM 80. The last hidden layer is thus updated for the next cycle in which the next word of the canonical prefix is predicted.

As an example, the first MLP 72 may be composed of two fully-connected layers of 100 dimensions for the first layer and 200 dimensions for the second one (with a sigmoid function between). The size of the embedding and of the hidden layers in the LSTMs 76, 80 may be set to 100. The MLP 84 predicting the next word may be composed of two fully-connected layers of 100 dimensions for the first layer, with a sigmoid function between the first and second layers. The number of canonical words for the second layer of the MLP 84 may be from 20 to 1000, or 40 to 80, depending on the domain of interest.

With $u_b$ focusing on the actual words and $u_l$ focusing more on the global context, the combination of the two representations is able to capture the semantics of the natural utterance 12 better than a single representation. The two representations focus on different aspects of the natural utterance that are both useful for predicting the correct canonical form. For example, the LSTM model 76 may understand that 'the sentence talks about some statistics of a certain player' and the MLP model 72 may understand that the sentence specifically mentions 'rebounds' and 'kobe bryant'. Learning jointly a context representation can help the recurrent neural network 70 to make predictions.

The probability of generating the sequence of words of the canonical utterance 14, given the sequence of words $x_1, \ldots, x_T$ in the natural utterance 12 can be estimated as:

$$p(y_1, \ldots, y_T | x_1, \ldots, x_T) = \Pi_{t=1}^{T} p(y_t | u_l, u_b, y_1, \ldots, y_{t-1}) \quad (1),$$

i.e., as the product of all the probabilities $p(y_t)$ for the words of the canonical form generated, where each $p(y_t)$ is a function of $u_l, u_b$ and all the prior words $y_1, \ldots y_{t-1}$ of the canonical form generated prior to $y_t$. To allow generalization over the prior words $y_1, \ldots y_{t-1}$, Eqn (1) can be replaced by:

$$p(y_1, \ldots, y_T | x_1, \ldots, x_T) = \Pi_{t=1}^{T} p(y_t | u_l, u_b, c_{l,t-1}) \quad (2),$$

where $c_{l,t-1}$ corresponds to the last hidden state of the second LSTM.

The next term of the canonical form 14 is estimated by the second MLP 84 as:

$$p(y_t | u_l, u_b, c_{l,t-1}) = \text{softmax}(W'_2(s'(W'_1(z)))) \quad (3),$$

where z is a combined representation 92, such as the concatenation of the vectorial representations $u_l$, $u_b$ and $c_{l,t-1}$, $W'_1$, $W'_2$ are parameter matrices that are learned during training, and s' is a non-linear activation function, e.g., the hyperbolic tangent activation function tan h.

The softmax function is an operation that maps the vector $W'_2(s'(W'_1(z)))$ to a vector of probabilities between 0 and 1 by taking the exponential of each coordinate and dividing it by a normalizing factor equal to the sum of these exponentials. In practice, a probability distribution is obtained and the term giving the maximum probability is chosen.

During prediction, the only representation evolving over time is $c_{l,t}$. The $u_l$ and $u_b$ do not change once the natural utterance has been "read."

Figure 5:
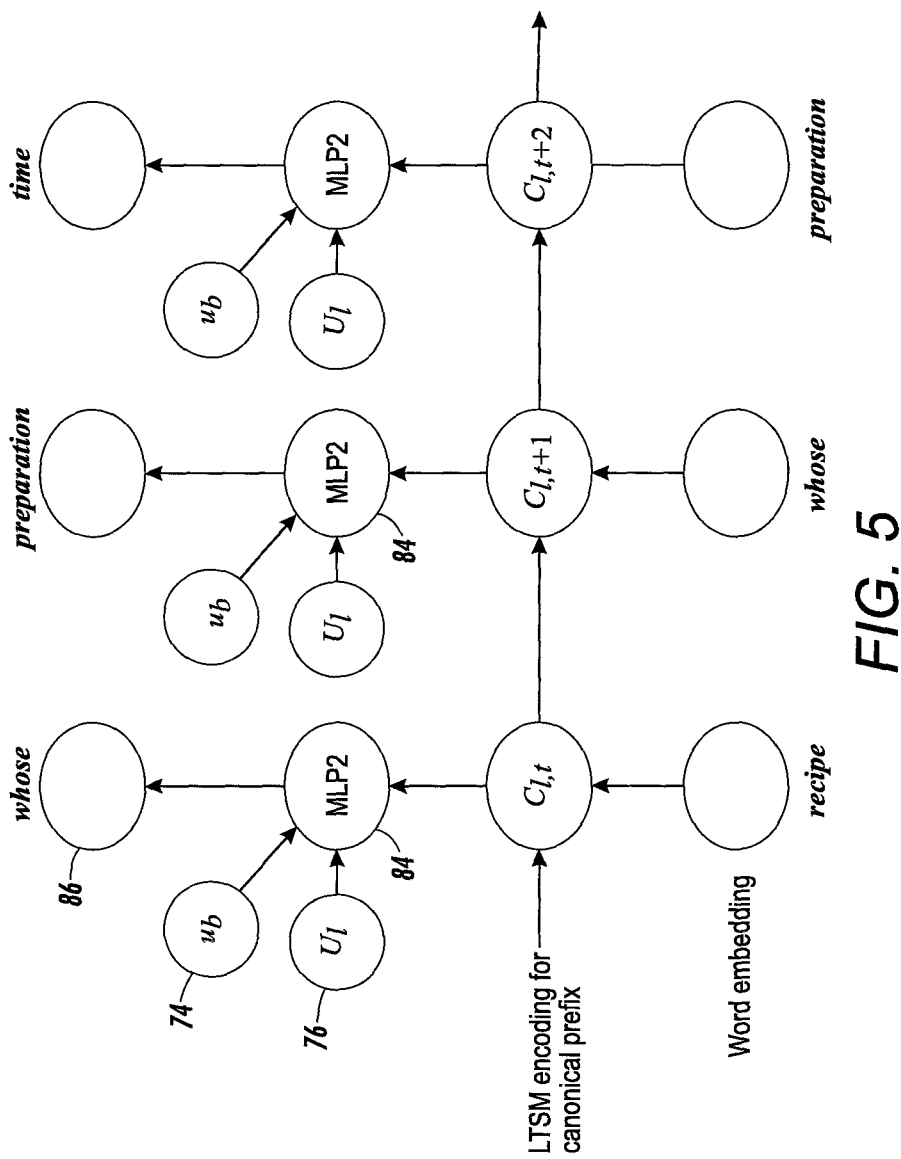
FIG. 5 illustrates LSTM decoding.

An example of the generation of the canonical form 14 is shown in FIG. 5. It is assumed that the natural language utterance is what recipe can be prepped in less time than rice pudding can be cooked. Assuming that, based on the $u_b$ 74 and $u_l$ 78 of the sentence, the system successfully produced the first canonical word recipe. The word embedding function 90 then embeds the current canonical prefix recipe, which is input to the second LSTM 80, which generates an encoding $c_{l,t}$ for the canonical prefix. The second MLP 84 takes as input $u_l$ 78 and $u_b$ 74 and the LSTM encoding $c_{l,t}$ of the canonical prefix up to time t, which is used to generate the probability distribution of next word 86 of the canonical form, and to draw from this distribution the next word of the canonical form, for instance, whose. In the next cycle, the LSTM 80 encodes the predicted part of the canonical form which is recipe whose, to generate $c_{l,t-1}$, which is input to the second MLP 84 with $u_l$ and $u_b$ to generate the next word preparation, and so forth. In the illustrative example, the resulting canonical form may be: recipe whose preparation time is smaller than cooking time of rice pudding.

While this example uses the reading order of the input text sequence 12 in computing $u_l$ and $u_b$, in another embodiment, the sequence may be reversed. In this case, the input would be cooked be can pudding rice than time less in prepped be can recipe what.

Training Data (S102)

The training data 62 includes text sequences 66 for a domain of interest (similar to sequences 12) and respective canonical forms 64. The training data may be obtained from a public source, such as that developed by Wang 2015. Or, if training data is not available for the domain of interest, it may be generated.

Figure 4:
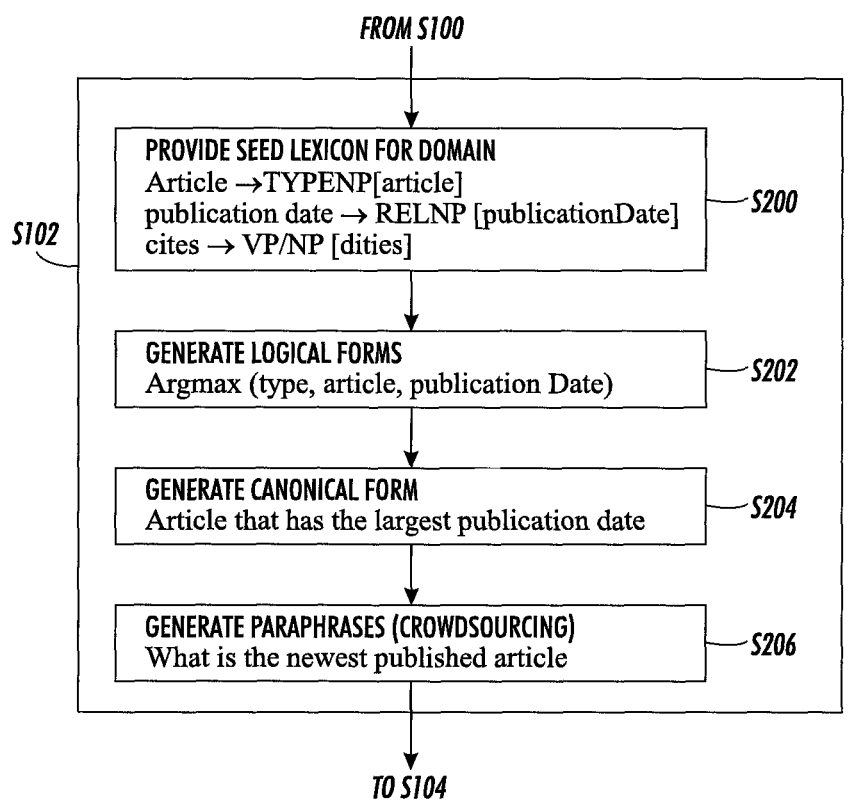
FIG. 4 illustrates generation of paraphrases for use as training data in the method of FIG. 2.

In one embodiment, the method for generating training data includes using crowdsourcing to provide paraphrases for each of a set of canonical forms, as described in Wang 2015. The paraphrase serves as the text sequence for the corresponding canonical form. As will be appreciated, this does not guarantee that the canonical form is a correct match for the text sequence, since the people providing the paraphrases may make errors, but it can be assumed that in general, there are sufficient correct training pairs for learning the neural network. FIG. 4 illustrates a method for generating the training set. At S200, a seed lexicon 68 may be provided or the domain of interest. As an example, the seed lexicon is generated from a database of triples of the form (e1,p,e2), where e1 and e2 are entities (e.g., article1, 2015) and p is a property (e.g., publicationDate). The database can be queried using lambda DCS logical forms. The seed lexicon specifies a canonical phrase ("publication date") for each predicate (publicationDate).

At S202, a set of logical forms may be generated based on the seed lexicon.

At S204, each logical form is parsed by a parser using a grammar to generate one or more canonical forms (essentially the reverse of step S110). The domain-general grammar, along with the seed lexicon and a database, is used to automatically generate a few hundred canonical utterances paired with their logical forms (e.g., "article that has the largest publication date" and arg max(type.article, publicationDate)). These utterances need not be the most elegant, but they should retain the semantics of the logical forms.

At S206, the canonical forms are crowdsourced to obtain one or more paraphrases for each canonical form. The crowdsourcing is used to paraphrase each canonical utterance into a few natural utterances (e.g., "what is the newest published article?").

The crowdsourcing thus creates a dataset consisting of (u, c, lf) tuples where u is a natural language utterance, c is its canonical form and lf is the logical form associated with c by the grammar.

For further details on crowdsourcing for generation of training data 62, see Wang 2015.

Learning the Neural Network Model (S104)

The text sequences in the training data 62 are input to the network model 70. The entire network model 70 is trained to minimize an objective function, which is a function of the cross entropy (or other loss function) between the predicted canonical form, output by the model 70, and the actual canonical form 64, from the training data 62, over all training pairs. The training includes updating the parameter matrices $W_1, W_2, W'_1, W'_2$ by backpropagation of a function of the loss E.

The objective function may be of the form: $H(p, q) = -\Sigma_x p(x) \log q(x)$, where p is the neural network predicted probability distribution and q is the empirical distribution associated with the training data.

In one embodiment, the model 70 is implemented in a neural network programming library, such as Keras (François Chollet, "Keras," GitHub repository, 2015, available at https://github.com/fchollet/keras; and "Keras: Deep Learning library for Theano and TensorFlow," available at http://keras.io/) on top of a compiler such as Theano (see, Bergstra, et al., "Theano: a CPU and GPU math expression compiler," Proc. Python for Scientific Computing Conf. (SciPy), vol. 4, p. 3, 2010; Bastien, et al., "Theano: new features and speed improvements" NIPS 2012 deep learning workshop; and Theano 0.7 documentation, available at http://deeplearning.net/software/theano/). The backpropagation algorithm used to train the neural network model 70 in Keras can be rmsprop (Tieleman et al., "Lecture 6.5-rmsprop: Divide the gradient by a running average of its recent magnitude," COURSERA: Neural Networks for Machine Learning 4, p. 2, 2012). The rmsprop method updates the weights in the weight matrices $W_1$, $W_2$, $W'_1$, $W'_2$ by keeping a moving average of the mean square for each weight as a sum of:

a) the previous mean square (weighted with a high weight, such as 0.9), and b) the value of the squared gradient at time t (weighted with a small weight, such as 0.1):

$$MeanSquare(w, t) = 0.9\ MeanSquare(w, t-1) + 0.1\left(\frac{\partial E}{\partial w}(t)\right)^2$$

The gradient is then divided by the square root of the mean square:

$$\frac{\frac{\partial E}{\partial w}(t)}{\sqrt{MeanSquare(w, t)}}.$$

The update for the weight is then proportional to this value (or proportional to some function of this value).

The training may proceed for a number mini batches and may be stopped when the objective function improves by less than threshold value.

Methods for learning neural network models 70 are described in LISA lab, University of Montreal, Deep Learning Tutorial Release 0.1, Sep. 1, 2015; Bojan Ploj, et al., "Border Pairs Method—Constructive MLP Learning Classification Algorithm," Advances in Machine Learning Research, Chapter 3, Vol. 6943 of the series Lecture Notes in Computer Science, pp 297-307 (2014) and Shashi Sathyanarayana "A Gentle Introduction to Backpropagation," available at http://numericinsight.com/uploads/A_Gentle_Introduction_to_Backpropagation.pdf.

The learned neural network model 70 can thus be used to map an input utterance 12, such as a question, to a predicted canonical form. Whereas Wang 2015 uses the paraphrases for trying to maximize similarity with the input through a search in the space of grammar derivations, in the present method, the training data 62 is used to learn the neural network model 70 which directly maps the input utterance into a canonical form 14, which then uniquely maps to a logical form 16.

Parsing (S110)

The exemplary parser 56 may include a grammar (e.g., set of rules) to derive a logical form 16 corresponding to a canonical utterance 14 output by the neural network model 70. The grammar is one which uniquely pairs logical forms with canonical textual forms. An example parser 56 which can be used includes grammatical rules similar to those described in Wang 2015, for example, but in this case, the grammar rules converts canonical forms to logical forms, rather than vice versa.

Querying the Knowledge Bases (S112, S114)

The logical form 16 can be used to generate a query for querying a knowledge base 20. The knowledge base may include a set of triples of the form (e1,p,e2), where e1 and e2 are entities (e.g., article1, 2015) and p is a property (e.g., publicationDate). The logical form is a semantic representation of a query 18 which refers to such predicates asp and such entities as e1, e2.

Generating Utterance (S116)

In another embodiment, the canonical form can be generated from an utterance of a person seeking assistance from a call center. The canonical form can be used by a dialog system to generate a next utterance for an agent conducting a discourse with the person. Dialogue systems are described, for example, in U.S. application Ser. No. 15/005,133, filed Jan. 25, 2016, entitled COMPLEXITY AWARE CALL-STEERING STRATEGY IN HETEROGENEOUS HUMAN/MACHINE CALL-CENTER ENVIRONMENTS, by Julien Perez, et al., U.S. application Ser. No. 14/702,850, filed May 4, 2015, entitled METHOD AND SYSTEM FOR ASSISTING CONTACT CENTER AGENTS IN COMPOSING ELECTRONIC MAIL REPLIES, by Marc Dymetman, et al., and U.S. application Ser. No. 14/811,005, filed Jul. 28, 2015, entitled A ROBUST REVERSIBLE FINITE-STATE APPROACH TO CONTEXTUAL GENERATION AND SEMANTIC PARSING, by Marc Dymetman, et al., the disclosures of which are incorporated herein by reference.

The method illustrated in FIGS. 2 and 4 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 48, (for example, an internal hard drive of RAM), or may be separate (for example, an external hard drive operatively connected with the computer 48), or may be separate and accessed via a digital data network such as a local area network (LAN) or the Internet (for example, as a redundant array of inexpensive or independent disks (RAID) or other network server storage that is indirectly accessed by the computer 48, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hard-wired electronic or logic circuit such as a discrete element circuit, a programmable logic device such as a PLD, PLA, FPGA, Graphics card CPU (GPU), or PAL, or the like. In general, any device, capable of implementing a finite state machine that is in turn capable of implementing the flowchart shown in FIGS. 2 and/or 4, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

The exemplary method can be compared to the SPO method described in Wang 2015 and has some notable differences which improve performance. The SPO method parses a natural utterance by first retrieving a list of possible logical forms and then learning to rank those. In this context, oracle accuracy is the accuracy that the retrieved list effectively contains one correct logical form and ranking accuracy is the accuracy of ranking the correct logical form in first position. An analysis of the SPO performance indicates that a significant problem with the system is its low oracle accuracy: very often, the retrieved list of logical forms does not contain the correct one.

To improve performance, the present method differs from SPO in at least the following ways. First, the parsing algorithm is modified. While SPO first uses its grammar to generate candidate canonical utterances related to the input utterance, then ranks them based on their similarity with the input, and finally takes the logical form of the best ranked sentence to be the meaning representation of the input, in the present method, the input utterance is directly mapped to a canonical utterance and then the grammar is used to derive the corresponding logical form. Second, the models used are very different. The present method uses a recurrent neural network to learn a model that maps natural utterances to canonical utterances. By contrast, SPO uses a paraphrase model to guide generation towards sentences that are similar to the input utterance.

The neural network can also be compared with those of Sutskever, et al., "Sequence to sequence learning with neural networks," Advances in Neural Information Processing Systems 27 (NIPS 2014), and Cho et al., "Learning phrase representations using RNN encoder-decoder for statistical machine translation," Proc. 2014 Conf. on Empirical Methods in Natural Language Processing (EMNLP), pp 1724-1734, 2014. The prediction output by the present method is not directly based on the hidden representations of an LSTM. Rather, an MLP 84 is built on top of this representation before prediction, which is beneficial for prediction.

The exemplary system and method provide improvements in fields such as automated and semi-automated dialogue systems for use in call-centers and in question-answering systems.

Without intending to limit the scope of the exemplary embodiment, the following examples illustrate the applicability of the method.

EXAMPLES

The OVERNIGHT dataset of paraphrases developed by the method of Wang 2015 was used to conduct the experiments. The OVERNIGHT dataset is available at https://github.com/percyliang/sempre and includes paraphrases generated from a seed lexicon, using crowdsourcing. This dataset contains various domains focusing on different linguistic phenomena such as multi-arity relations, sublexical compositionality, and the like. The utterance in each domain is annotated with both logical forms and canonical forms. The number of such utterances varies from 800 to 4000, depending on the domain.

TABLE 1 shows some example pairs of such natural utterances NL and their canonical form CF taken from the OVERNIGHT dataset.

TABLE 1

Example pairs of Natural Language Utterances and Respective Canonical Forms

NL: "find the people who joined their studies before alice was born"
CF: "student whose start date is at most birthdate of alice"
NL: "what recipe can be prepped in less time than rice pudding can be cooked"
CF: "recipe whose preparation time is smaller than cooking time of rice pudding"

Note that several utterances may be paired with the same canonical form. The utterances are further split into 80% for training and 20% for testing. For training, only natural utterances and canonical forms are used.

Before inputting to the neural network, the natural utterance sequence 12, 66 is reversed. Bigrams and their embeddings only come from the training set and unknown n-grams are ignored during testing. The same word (e.g., 'recipe') has different embeddings depending on whether it is in the natural utterance or canonical form. The model is implemented in Keras (https://github.com/fchollet/keras) on top of Theano (Bergstra et al., 2010). rmsprop (Tieleman and Hinton, 2012) is used in Keras as backpropagation algorithm to train our neural network. All the hyperparameters of rmsprop as well as ways to initialize the neural network model are left at their default values in the Keras library.

The objective function is learned on batches of training pairs.

The training is stopped when the objective function improves by less than threshold 0.01. The size of the embedding and of the hidden layers in the LSTMs is set to 100. The MLP generating $u_b$ is composed of two fully connected layers of dimension 100 at the first layer and 200 at the second one. The MLP predicting the next word has dimension 100 for the first layer and number of canonical words (40 to 80 depending on domains) for the second layer. All these hyperparameters were chosen based on preliminary experiments in the Basketball and the Social domain and were left unchanged for other domains.

In order to be able to make a reasonable comparison with the SPO method, the following were taken into consideration. The SPO method evaluates accuracy by computing the proportion of questions for which the method is able to retrieve the right answer. In order to make an exact comparison, the SPO grammar is rewritten into the Definite Clause Grammar (DCG) formalism (using the method of Pereira and Warren, 1980) and the grammar allows parsing each canonical form to a unique logical form. Once the logical forms are obtained, those logical forms are executed against the knowledge base to obtain the answer.

TABLE 2 shows the accuracy of obtaining the correct answer for the SPO method and for the present system.

Performance of accuracy of predicting the correct answer on training/test samples

| Original split | Basketball | Social | Publication | Blocks | Calendar | Housing | Restaurants |
|---|---|---|---|---|---|---|---|
| SPO | 0.46 | 0.48 | 0.59 | 0.42 | 0.74 | 0.54 | 0.76 |
| LSTM + bow2 (2-layer) | 0.80 | 0.80 | 0.70 | 0.54 | 0.73 | 0.64 | 0.71 |

From Table 2, it can be observed that for most domains, the present system using LSTM consistently outperforms SPO by a significant margin. Also, it suggests that the present system has a reasonable robustness across different domains.

The example illustrates that the exemplary method for building a semantic parser by predicting canonical forms generated from a grammar, and using a seq2seq neural network for predicting these forms from natural utterances is effective. The experiments show that by predicting the canonical form and then parsing the canonical form to logical form and then retrieving the answer, the proposed model can predict the correct answer with significantly higher accuracy than previously reported results.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method comprising:
providing a neural network model which has been trained to predict a canonical form, containing a sequence of words, for an input text sequence, containing a sequence of words, the neural network model comprising:
an encoder which generates a first representation of the input text sequence based on a representation of n-grams in the text sequence, the encoder including a first neural network which reads the input text sequence and generates a second representation of the input text sequence, and
a decoder which sequentially predicts a next term of the canonical form, based on the first and second representations and a predicted prefix of the canonical form, the prefix containing a sequence of at least one word;
receiving an input text sequence, containing a sequence of words;
with a processor, predicting a canonical form, containing a sequence of words, for the input text sequence with the trained neural network model; and
outputting information based on the predicted canonical form.

2. The method of claim 1, further comprising:
parsing the predicting canonical form to generate a logical form; and
generating a query based on the logical form.

3. The method of claim 2, further comprising:
querying a knowledge base with the query; and
retrieving a response to the query from the knowledge base, the output information being based on the response.

4. The method of claim 1, further comprising:
training the neural network model on training data, the training data comprising training pairs, each training pair including a canonical form and a corresponding text sequence.

5. The method of claim 4, further comprising:
generating the training pairs comprising collecting text sequences for a set of canonical forms using crowd-sourcing.

6. The method of claim 1, wherein the first neural network comprises a first recurrent neural network.

7. The method of claim 6, wherein the first recurrent neural network is a first long short-term memory neural network.

8. The method of claim 1, wherein the decoder comprises a second neural network which sequentially predicts the prefix of the canonical form.

9. The method of claim 8, wherein the second neural network comprises a second long short-term memory neural network.

10. The method of claim 8, wherein the decoder comprises a multilayer perceptron which sequentially generates a next term of the canonical form based on the first and second representations and the predicted prefix of the canonical form.

11. The method of claim 1, wherein the next term of the canonical form is estimated as:

$$P(y_t|u_l, u_b, c_{l,t-1}) = s'(W'_2(s'(W'_1(z)))) \quad (3),$$

where z is a combined representation generated from the first and second representations and the predicted prefix $c_{l,t-1}$ of the canonical form, $W'_1$, $W'_2$ are parameter matrices that are learned during training, and s' is a non-linear activation function.

12. The method of claim 1, wherein the neural network model includes at least one embedding layer which converts words of the input text sequence to vectorial representations.

13. A system comprising memory which stores instructions for performing the method of claim 1 and a processor in communication with the memory which executes the instructions.

14. A computer program product comprising a non-transitory storage medium storing instructions which, when executed by a computer, perform the method of claim 1.

15. A method comprising:
providing a neural network model which has been trained to predict a canonical form for an input text sequence, the neural network model comprising:
an encoder which comprises a first multilayer perceptron which generates a first representation of the input text sequence based on a representation of n-grams in the text sequence, and
a first recurrent neural network which reads the input text sequence and generates a second representation of the input text sequence, and
a decoder which sequentially predicts a next term of the canonical form, based on the first and second representations and a predicted prefix of the canonical form;
receiving an input text sequence;
with a processor, predicting a canonical form for the input text sequence with the trained neural network model; and
outputting information based on the predicted canonical form.

16. A system comprising:
memory which stores a neural network model which has been trained to predict a canonical form for an input text sequence, the neural network model comprising:
an encoder which generates a first representation of the input text sequence based on a representation of n-grams in the text sequence and a second representation of the input text sequence generated by a first neural network, and
a decoder which sequentially predicts terms of the canonical form based on the first and second representations and a predicted prefix of the canonical form;

a prediction component which predicts a canonical form for an input text sequence with the trained neural network model;

a semantic parser which generates a logical form based on the predicted canonical form;

an output component which outputs information based on the predicted canonical form; and a processor which implements the prediction component and the output component.

17. The system of claim 16, further comprising a learning component which trains the neural network model on training data, the training data comprising training pairs, each training pair including a canonical form and a corresponding text sequence.

18. The system of claim 17, further comprising a querying component which queries a knowledge base with a query based on the logical form for retrieving responsive information.

19. A method for predicting a canonical form comprising:

providing training data, the training data comprising a collection of training pairs, each training pair in the collection including a canonical form, containing a sequence of words, and a corresponding text sequence, containing a sequence of words;

with the training data, training a neural network model to predict a canonical form, containing a sequence of words, for an input text sequence, the neural network model comprising:

an encoder which generates a first representation of the input text sequence based on a representation of n-grams in the text sequence and a second representation of the input text sequence generated by a first neural network, and a decoder which sequentially predicts terms of the canonical form based on the first and second representations and a predicted prefix of the canonical form, each of the terms of the canonical form including at least one word;

receiving an input text sequence, containing a sequence of words;

with a processor, predicting a canonical form, containing a sequence of words, for the input text sequence with the trained neural network model; and outputting information based on the predicted canonical form.

\* \* \* \* \*